United States Patent [19]

Krause

[11] Patent Number: 4,603,712

[45] Date of Patent: Aug. 5, 1986

[54] COMPOUNDED POLYCHLOROPRENE FORMULATION USED AS AN ADHESIVE LAYER IN THE MANUFACTURE OF ELASTOMERIC ARTICLES

[75] Inventor: Keith M. Krause, Westminster, Colo.

[73] Assignee: The Gates Rubber Company, Denver, Colo.

[21] Appl. No.: 717,622

[22] Filed: Mar. 29, 1985

[51] Int. Cl.$^4$ ............................................. F16L 9/14
[52] U.S. Cl. .................................. 138/137; 138/141;
428/36; 428/421; 428/516; 428/520
[58] Field of Search .............. 138/137, 140, 141, 124, 138/125, 126, 146; 428/36, 421, 520, 517, 516; 156/307.1, 294; 525/379

[56] References Cited

U.S. PATENT DOCUMENTS

| | | | |
|---|---|---|---|
| 3,561,493 | 2/1971 | Maillard | 138/137 |
| 3,599,677 | 8/1971 | O'Brien | 138/137 |
| 3,651,176 | 3/1972 | Usamoto . | |
| 3,682,201 | 8/1972 | Atwell et al. | 138/137 |
| 3,927,695 | 12/1975 | Crockwell | 138/137 |
| 3,988,188 | 10/1976 | Johansen et al. | 138/126 |
| 4,003,416 | 4/1977 | Weidenaar et al. . | |
| 4,007,070 | 2/1977 | Busdiecker | 138/124 |
| 4,091,843 | 5/1978 | Mikes et al. | 138/125 |
| 4,096,888 | 6/1978 | Stefano et al. | 138/125 |
| 4,209,042 | 6/1980 | Buan | 138/126 |
| 4,256,858 | 3/1981 | Behr . | |
| 4,330,017 | 5/1982 | Satoh et al. | 138/137 |
| 4,361,608 | 11/1982 | Furukawa et al. | 428/36 |
| 4,394,205 | 7/1983 | Blenner . | |
| 4,457,799 | 7/1984 | Dunn | 138/137 |

Primary Examiner—Stephen Marcus
Assistant Examiner—L. J. Peters
Attorney, Agent, or Firm—C. H. Castleman, Jr.; H. W. Oberg, Jr.; Frank P. Grassler

[57] ABSTRACT

An example of an elastomeric article embodying the invention is a composite, reinforced, vulcanized elastomeric hose, which includes a tube, an outer cover, a reinforcement layer, and a specially compounded interlayer interposed either between the tube and the reinforcement or the cover and the reinforcement. The inner tube (or in some applications, the cover) is composed of either a fluoroelastomer, fluoroplastic, polypropylene, polyvinylchloride, chlorinated polyethylene, or acrylonitrile polymer. The compounded polychloroprene interlayrer effects a strong bond to these materials. The tube and the cover are composed of materials not readily bondable to each other. The polychloroprene interlayer forms a strong bond to those layers it is in contact with when vulcanized.

26 Claims, 4 Drawing Figures

COMPOUNDED POLYCHLOROPRENE FORMULATION USED AS AN ADHESIVE LAYER IN THE MANUFACTURE OF ELASTOMERIC ARTICLES

BACKGROUND OF THE INVENTION

This invention relates to a precompounded polychloroprene (neoprene) formulation that bonds effectively to fluoroelastomers, fluoroplastics, polypropylene, polyvinylchloride, chlorinated polyethylene, and acrylonitrile polymers when vulcanized in contact with these materials. The invention further relates to incorporating this material as a bonding layer into an elastomeric article, for instance a hose, in which one layer (i.e. tube or cover) is made of one of the above listed materials, and it is not readily bondable to the other layer (i.e. reinforcement layer, cover, tube). The bonding layer then forms a strong bond to both layers it is in contact with when vulcanized, as when used as an interlayer between a tube and cover of dissimilar materials not readily bondable to each other.

In the past, organic acceleration systems such as: ethylene thiourea; salicyclic acid, tetramethylthiuram monosulfide-sulfur; diphenylguanidine-sulfur; diorthotolyguanidine salt of dicatecholborate; and tetramethylthiuram monosulfide-sulfur-diorthotolyguanidine were commonly used to vulcanize polychloroprene. Organic accelerators are generally used to aid in controlling the time and temperature required for vulcanization and thereby improve the properties of the vulcanizate. To Applicant's knowledge, the accelerator has not been used heretofor as a facilitator to promote bonding between two layers made of unlike materials when vulcanized in contact with each other.

In hose manufacture, a manually applied adhesive has been previously used to bond the tube layer to the cover upon curing. However, the application of the adhesive adds to the cost of manufacture and complicates processing.

Prior art incorporating a bonding layer or an elastomeric interlayer in hose manufacture include U.S. Pat. Nos. 3,651,176 to Usamoto et al, 3,660,224 to Cau et al, 3,712,360 to Torti et al, 3,994,453 to Chudgar et al, and 4,096,888 to Stefano et al.

It is a primary object of the invention to provide a compounded polychloroprene formulation that effectively bonds to fluoroelastomers, fluoroplastics, polypropylene, polyvinylchloride, chlorinated polyethylene, and acrylonitrile polymers when vulcanized in contact with these materials. A further object is to provide a hose incorporating this polychloroprene formulation as an interlayer between the tube and cover, which bonds to both layers it is in contact with upon vulcanization of the hose, using a standard vulcanization process and without the need for separate bonding layers.

SUMMARY OF THE INVENTION

In one aspect, the invention is directed to a compounded polychloroprene formulation incorporating a multifunctional amine accelerator such as guanidine and a multifunctional carboxylic acid retarder such as phthalic anhydride. This acceleration system promotes bonding between the polychloroprene layer and layers made of dissimilar materials such as fluoroelastomers, fluoroplastics, polypropylene, polyvinylchloride, chlorinated polyethylene, and acrylonitrile polymers when vulcanized in contact with these materials. In an alternate formulation amino-silane is used as an accelerator along with the multifunctional amine accelerator. There is no multifunctional carboxylic acid retarder used in this alternate formulation because its presence in conjunction with the amino-silane would accelerate the curing of the materials to such a degree that poor bonding would result.

In a further aspect, the invention is drawn to a composite hose article including (1) a first annular member composed of either fluoroelastomers, fluoroplastics, polypropylene, polyvinylchloride, chlorinated polyethylene or acrylonitrile polymers, (2) a second annular member of a material not readily bondable to the material in the first annular member, one of the annular members serving as an outer cover and the other as an inner tube for the hose composite, (3) a reinforcement layer that is either a fibrous layer interposed between the tube and cover, or an elastomeric layer, in which cord or other reinforcement is embedded, and which is not readily bondable to the first annular member, and (4) an interlayer of a heat setting compounded polychloroprene formulation; e.g., of the type described in the preceding paragraph, interposed between and bonded to both the inner tube and the reinforcement layer, or interposed between and bonded to both the outer cover and the reinforcement layer, depending on the nature of the reinforcement used.

In another aspect, the invention pertains to a method of using an organic acceleration system to effect the bonding of the polychloroprene layer to both adjacent layers when the hose is vulcanized.

In yet another aspect, the invention pertains to a method for making the composite hose, including the steps of: (1) forming a cylindrically shaped tube comprised of fluoroelastomers, fluoroplastics, polypropylene, polyvinylchloride, chlorinated polyethylene or acrylonitrile polymers, (2) applying to at least one side of a reinforcement layer a gum layer of polychloroprene vulcanizable elastomer, (3) positioning the reinforcement layer about the tube with the gum layer of polychloroprene interposed between the tube and the reinforcement layer, or if desired, between the reinforcement and the cover, (4) applying a cover over the reinforcement and/or polychloroprene gum layers, and (5) vulcanizing the thus formed article to produce a composite unitary hose.

The hose articles of the invention encompass various types of reinforced hoses for various services including, by way of illustration, industrial solvent hose, acid chemical hose, and fuel transfer hose.

BRIEF DESCRIPTION OF THE DRAWINGS

The invention will be more particularly set forth in certain illustrated embodiments by reference to the accompanying drawing, in which.

PREFERRED EMBODIMENTS OF THE INVENTION

Figure 1:
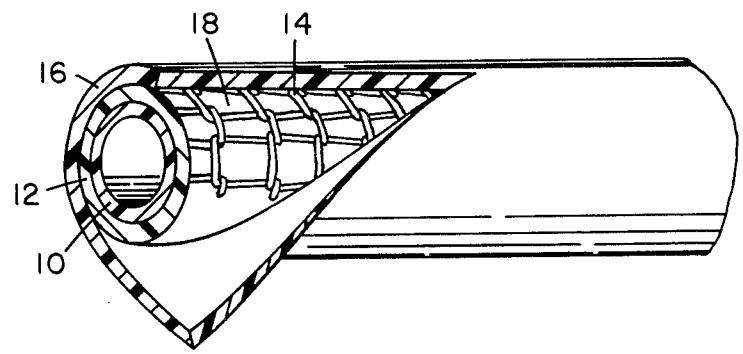
FIG. 1 is a cutaway section of a hose embodying the invention.
Figure 2:
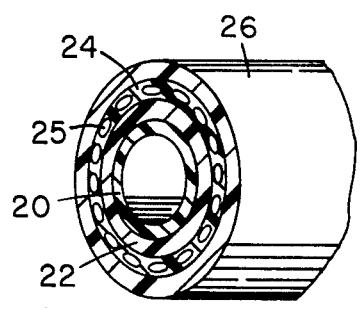
FIG. 2 is a section of hose, in which the reinforcement is embedded in an elastomeric layer.

An illustrative petrochemical hose made in accordance with the invention is shown in FIG. 1. The outer surface of the hose is composed of an elastomeric cover 16. In accordance with the invention, the cover 16 is composed of a polymeric material dissimilar and not readily bondable with the tube 10, in this example a fluoroelastomer. The tie gum layer 12 is interposed between the fabric (e.g., knit) reinforcement 14 and the inner tube member 10, and it is directly bonded to the inner tube along their mutual interface. In turn, the tie gum layer 12 is directly bonded to the outer cover elastomeric layer 16 through interstices 18 in the fibrous reinforcement 16. An alternate configuration, illustrated in FIG. 2, shows a composite hose, in which the reinforcement is embedded in a layer of elastomeric material 24, e.g., a frictioned or skimmed square woven or tire cord fabric 25, applied as a helical wrap. This allows the interposed tie gum layer 22 to bond directly to the reinforcement layer 24 and the tube 20.

Figure 3:
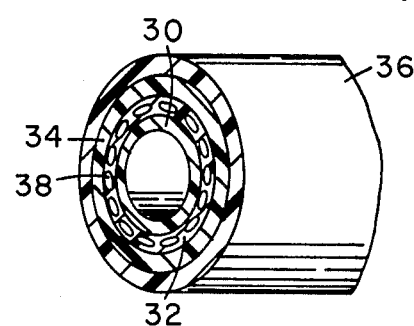
FIG. 3 is a section of hose, in which the polychloroprene tie gum layer is inserted between the cover layer and the reinforcement layer.

In the alternative configuration shown in FIG. 3, the tie gum layer 34 is interposed between the cover layer 36 and the reinforcement layer 32. This configuration is useful to protect the hose from the surrounding environment. A hose that drains water from the roof of a floating-roof fuel storage tank suitably employs this configuration. The fluid conveyed through the tube is water, but the hose exterior must be protected from the fuel in the tank, the medium through which the hose conducts the water. In this example the tube may be formed of polychloroprene, and the cover of fluoroelastomer.

In general, one of the inner tube or cover, usually the tube, is composed of either fluoroelastomers, fluoroplastics, polypropylene, polyvinylchloride, polyethylene, chlorinated polyethylene, or acrylonitrile polymers.

The other member, generally the outer cover layer 16 or reinforcement layer 24, is composed of a heat setting elastomeric material and differs from the tube material 10, 20 and is not readily bondable to the same. The bond is not affected by the degree of saturation of the elastomeric material as adequate bonds are formed with both saturated and unsaturated materials. Representative examples of suitable cover materials include natural rubber, butadiene-styrene rubbers (SBR), isoprene rubber, nitrile rubber (NBR), chloroprene, and various plastics. It should be noted that even if the tube is composed of, for example, a fluoroplastic and the cover composed of chlorinated polyethylene, then the tie gum layer of the invention would still be necessary to bond the tube to the cover.

Figure 4:
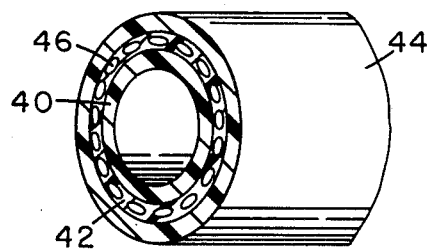
FIG. 4 is a section of hose, in which the reinforcement material is embedded in the polychloroprene tie gum layer.

FIG. 4 shows an alternate embodiment in which the polychloroprene tie gum material is skimmed over the reinforcement layer prior to hose construction. The reinforcement 46 is then embedded in the polychloroprene layer 42, which is wrapped about the tube 40. A protective cover layer 44 is then wrapped about tie gum reinforcement layer 44. The net result is the elimination of one layer of hose by combining the functions of the reinforcement and tie gum layers.

Also, note that if the cover and tube are formed of the same material, but the reinforcement layer consists of cord or other reinforcement embedded in a dissimilar elastomeric material, a tie gum layer would be necessary to bond the tube to the reinforcement, and another would be necessary to bond the cover to the reinforcement.

The interlayer according to the invention is preferably a distinct vulcanizable tie gum. Generally, the thickness of the layer need only be from about 0.005 to about 0.06 inches for good adhesion.

The compounded polychloroprene formulation is applied as a bonding layer between the dissimilar layers of the hose. The basic principle is that the polychloroprene formulation, with the special organic acceleration system evenly distributed throughout, bonds to a variety of materials upon vulcanization. Rather than applying an epoxy between layers to achieve bonding, the bonding mechanism is incorporated into one of the hose layers (the interlayer), making the entire hose building process easier and more efficient.

Generally, the organic acceleration system proven to be effective incorporates a guanidine as a multifunctional amine accelerator, and in addition either (i) a multifunctional carboxylic acid such as phthalic anhydride as a retarder/facilitator, or (ii) an amino-silane as a companion accelerator.

In the first embodiment, any multifunctional carboxylic acid will perform adequately as long as it contains two or more carboxyl groups. If amino-silane is used as an accelerator along with the guanidine, as in the second embodiment (Example 2), the multifunctional carboxylic acid is not added because the more reactive amino-silane does not require the presence of the polycarboxylic acid to initiate the mechanism. A representative formulation is (parts by weight):

Polychloroprene (W type): 100
Fillers and pigments: 97
Oil: 10
Plastic: 7.5
Antioxidant: 2
Accelerator(s): 1–5
Multifunctional carboxylic acid retarder: 1–3

A W-type polychloroprene is used in the formulation because the G-types contain sulfur and other additives that cure too quickly, resulting in a poor bond to the adjacent layer.

An alternate embodiment is represented by the following formulation (parts by weight) in which the amino-silane is used as an accelerator, thereby eliminating the need for the multifunctional carboxylic acid retarder.

Polychloroprene (W type): 100
Fillers and pigments: 97
Oil: 10
Plastic: 7.5
Antioxidant: 2
Accelerator(s):
    mulifunctional amine acclerator: 0.2–1
    amino-silane accelerator: 1–3

Note that the only quantities varied are the accelerator and retarder. This is due to the fact that the quantities of the other ingredients affect processability only, and the concentrations don't affect the bonding capabilities of the tie gum. The quantities of fillers, pigments, oil and plastic therefore were calculated to optimize processability for a specific application and are not limited to specific quantities. The formulations presented, therefore, are for illustration only, and are not intended to limit the components of the formulation to specific quantities or, for that matter, the need for a particular component.

The reinforcement, which is embedded in the hose article, is preferably a cord embedded in an elastomeric material and spiral wrapped about the tube. The tie gum then bonds directly to the reinforcement layer upon vulcanization. Alternately, the reinforcement layer can be a woven fabric, which has interstices therein permitting flow through, to some degree, of the adjacent elastomeric layers for intimate bonding contact with one another. This reinforcement is normally embedded in the hose wall to provide the necessary burst resistance. The fibrous textile reinforcement may be used, for example, as a woven fabric, a knit, braid, spiral and the like, formed of filaments, cords, twisted strands or staple fibers of a polymeric material. The reinforcement may be twined about the inner tube in continuous fashion using a braiding or knitting machine, for instance, or wrapped on the tube, and in the latter case is preferably rubberized, according to the invention, with the interlayer tie gum applied to one or both surfaces of the reinforcement.

In general, a plurality of layers of reinforcement may be included. However, in the case where multiple plies are employed, the plies should preferably not be in direct contact with one another but should be separated by an insulating layer of elastomeric material, which in this case could either be additional polychloroprene or the material mutually bondable to the cover and polychloroprene layers.

EXAMPLE 1

A compounded polychloroprene formulation in which the following ingredients are combined by weight in the specified proportions:
Polychloroprene (W type): 100
Fine particle size washed clay: 57
Anhydrous silica: 22
Litharge ® lead oxide: 20
Plastic (low density polyethylene): 7.5
Antioxidant (octylated diphenylamine): 2
Oil (butyl oleate): 10
Retarder (phthalic anhydride): 1
Accelerator (diphenylguanidine): 3

The amount and type of fillers depends on the color and properties desired. The anhydrous silica has a dual purpose in that it provides reaction sites for the mechanism and absorbs water produced in the reaction. The lead oxide was selected primarily for its metal ion properties, and is used to facilitate the reaction mechanism. The formulation was compounded prior to being used in the manufacture of the hose, and the specific gravity of the formulation was 1.58.

The compounded polychloroprene formulation was formed into a web strip and then wrapped about an extruded tube made of fluoroelastomers. A reinforcement consisting of tire cord embedded in an elastomeric material was wrapped about the polychloroprene bonding layer. A thin layer of nylon tape was then wrapped about the reinforcement layer, to ensure that the hose remains uniform during curing. Upon vulcanization at 338 F.° and 100 psi, the organic accelerators in the polychloroprene layer cause the polychloroprene layer to bond to both the tube and elastomeric reinforcement layer or cover layer. After aging 70 hrs. at 158° F., the resultant tube to bonding layer adhesion was 66 lbs. The initial adhesion of the bonding layer to reinforcement layer, in this example, was 49 lbs. Results vary somewhat depending on the length of time the hose is aged.

All measurements were taken using ASTM method D-2084.

EXAMPLE 2

A compounded polychloroprene formulation in which the following ingredients are combined by weight:
Polychloroprene (W type): 100
Fine particle size washed clay: 57
Anhydrous silica: 22
Litharge ® lead oxide: 20
Plastic (low density polyethylene): 7.5
Antioxidant (butylated paracresol dicyclopentadiene): 2
Oil (butyloleate): 10
Accelerator (amino-silane): 3
Accelerator (diphenylguanidine): 0.5

Again, the amount and type of fillers depend on the color and properties desired. The anhydrous silica has a dual purpose in that it provides reaction sites for the mechanism and absorbs water produced in the reaction. The lead oxide was selected primarily for its metal ion properties, and is used to facilitate the reaction mechanism. The formulation was compounded prior to being used in the manufacture of the hose, and the specific gravity of the formulation was 1.5. The method of hose construction is identical to that described in the previous example.

The initial tube to reinforcement adhesion ranged from 32 lbs. to 34 lbs., and the aged results ranged from 29 lbs. to 50 lbs. All measurements were taken using ASTM method D-2084. No retarder is used in this formulation because of the presence of the amino-silane as an accelerator. The retarder is unnecessary because the amino-silane, being more reactive than the guanidine, does not need the retarder to facilitate the reaction mechanism. In fact, if the retarder were to be added, the reaction would proceed too rapidly and proper bonding would not occur.

It will be understood that the invention is capable of a variety of modifications and variations, which will become apparent to those skilled in the art upon a reading of this specification, the scope of the invention being defined by the appended claims.

What is claimed is:

1. A unitary reinforced vulcanized elastomeric hose article for conveying fluids including an inner tube and outer cover, which are composed of dissimilar polymers not readily bondable to one another comprising:
    an inner tube made of a material selected from the group consisting of fluoroelastomers, fluoroplastics, polypropylene, polyvinylchloride, polyethylene, chlorinated polyethylene, and acrylonitrile polymers;
    an outer heat setting cover made of a material selected from the group consisting of fluoroelastomers, fluoroplastics, polypropylene, polyvinylchloride, polyethylene, chlorinated polyethylene, and acrylonitrile polymers but dissimilar from the material selected for said tube;
    an elastomeric tie gum layer of compounded polychloroprene formulation incorporating a multifunctional amine accelerator and a multifunctional carboxylic acid retarder bonded through vulcanization to said inner tube and cover; and
    a reinforcement layer embedded in the hose.

2. The hose of claim 1 wherein the formulation is comprised of the following portions in parts by weight:

W type polychloroprene: 100;
Multifunctional amine accelerator: 0.2-5;
Multifunctional carboxylic acid retarder: 1-3;
Antioxidant: 0-10;
Plasticizer: 0-20;
Fillers: 10-200; and
Oil: 0-60.

3. The formulation of claim 2 wherein the multifunctional amine accelerator is dephenylguanidine.

4. The formulation of claim 2 wherein the multifunctional amine accelerator is diorthotolyguanidine.

5. The hose of claim 1 wherein the outer cover is made of a material selected from the group consisting of fluoroelastomers and fluoroplastics.

6. The hose of claim 1 wherein the inner tube is made of a material selected from the group consisting of fluorelastomers and fluoroplastics.

7. A unitary reinforced vulcanized elastomeric hose article for conveying fluids including an inner tube and outer cover, which are composed of dissimilar polymers not readily bondable to one another comprising:
  an inner fluorine-containing polymeric tube;
  an outer heat setting polymeric cover;
  an elastomeric tie gum layer of compounded polychloroprene formulation interposed between said inner tube and said outer cover; and
  a reinforcement layer embedded in the hose.

8. The hose of claim 7 wherein the cover material is selected from the group consisting of polypropylene, chlorinated polyethylene, acrylonitrile polymers, and polyvinylchloride.

9. The hose of claim 7 wherein the reinforcement consists of cord embedded in an elastomeric material, and is securely bonded to the elastomeric tie gum layer.

10. The hose of claim 7 wherein the reinforcement consists of at least one layer of woven fabric in any configuration in which there are interstices through which the polychloroprene formulation may securely bond to either the inner tube or the outer cover, depending on the placement of the reinforcement relative to the other layers.

11. The hose of claim 7 wherein the tube is composed of a fluoroelastomer or fluoroplastic.

12. A unitary reinforced vulcanized polymeric hose article for conveying fluids including an inner tube and outer cover, which are composed of dissimilar polymers not readily bondable to one another comprising:
  an inner heat setting polymeric tube;
  an outer fluorine-containing polymeric cover;
  a reinforcement material; and
  an elastomeric tie gum layer of compounded polychloroprene formulation skimmed about the reinforcement material and interposed between said inner tube and said outer cover.

13. The hose of claim 12 wherein the cover is composed of a fluoroelastomer or fluoroplastic.

14. The hose of claim 12 wherein the tube material is selected from the group consisting of polypropylene, chlorinated polyethylene, acrylonitrile polymers, and polyvinyl chloride.

15. A unitary reinforced vulcanized polymeric hose article for conveying fluids including an inner tube and reinforcement layer, which are composed of dissimilar polymers not readily bondable to one another comprising:
  an inner heat setting fluorine-containing polymeric tube;
  an outer heat setting polymeric cover;
  a reinforcement layer; and
  an elastomeric tie gum layer of compounded polychloroprene formulation wrapped about said inner tube and interposed between said inner tube and said reinforcement layer.

16. The hose of claim 15 wherein the tube is composed of a fluoroelastomer or fluoroplastic.

17. The hose of claim 15 wherein the reinforcement consists of tire cord fabric embedded in an elastomeric material and wrapped about the elastomeric tie gum layer.

18. The hose of claim 15 wherein the cover material is selected from the group consisting of polypropylene, chlorinated polyethylene, acrylonitrile polymers, and polyvinylchloride.

19. An article of manufacture comprising a first layer including a compounded, W-type polychloroprene formulation incorporating a multifunctional amine accelerator and a multifunctional carboxylic acid retarder bonded through vulcanization to a second layer selected from the group consisting of fluoroelastomers, fluoroplastics, polypropylene, polyvinylchloride, polyethylene, chlorinated polyethylene, and acrylonitrile polymers.

20. The formulation of claim 19 wherein the multifunctional amine accelerator is diorthotolyguanidine.

21. The formulation of claim 19 wherein the multifunctional amine accelerator is diphenylguanidine.

22. The formulation of claim 19 wherein the formulation is comprised of the following proportions in parts by weight:
W type polychloroprene: 100;
Multifunctional amine accelerator: 0.2-5;
Multifunctional carboxylic acid retarder: 1-3;
Antioxidant: 0-10;
Plasticizer: 0-20;
Fillers: 10-200; and
Oil: 0-60.

23. An article of manufacture comprising a first layer including a compounded, W-type polychloroprene formulation incorporating a multifunctional amine accelerator and an aminosilane accelerator bonded through vulcanization to a second layer selected from the group consisting of fluoroelastomers, fluoroplastics, polypropylene, polyvinyl chloride, polyethylene, chlorinated polyethylene, and acrylonitrile polymers.

24. The formulation of claim 23 wherein the multifunctional amine accelerator is diorthotolyguanidine.

25. The formulation of claim 23 wherein the multifunctionial amine accelerator is diphenylguanidine.

26. The formulation of claim 23 wherein the formulation is comprised of the following proportions in parts by weight:
W type polychloroprene: 100;
Multifunctional amine accelerator: 0.2-1;
Amino-silane accelerator: 1-3;
Antioxidant: 0-10;
Plasticizer: 0-20;
Fillers: 10-200; and
Oil: 0-60.

* * * * *